(12) United States Patent
Jha et al.

(10) Patent No.: US 12,394,108 B2
(45) Date of Patent: Aug. 19, 2025

(54) METHOD AND SYSTEM FOR VIRTUAL OBJECT POSITIONING IN AN AUGMENTED REALITY OR VIRTUAL REALITY ENVIRONMENT

(71) Applicant: SAMSUNG ELECTRONICS CO., LTD., Suwon-si (KR)

(72) Inventors: Vishal Bhushan Jha, Dhanbad (IN); Amit Chowdhury, Bengaluru (IN); Ajay Surendranath, Bangalore (IN); Debayan Mukherjee, Bangalore (IN); Raghavan Velappan, Bangalore (IN); Sudip Roy, Bengaluru (IN); Swadha Jaiswal, Bengaluru (IN); Zunaira Naqvi, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 213 days.

(21) Appl. No.: 18/100,915

(22) Filed: Jan. 24, 2023

(65) Prior Publication Data
US 2023/0169699 A1 Jun. 1, 2023

Related U.S. Application Data

(63) Continuation of application No. PCT/KR2022/017480, filed on Nov. 8, 2022.

(30) Foreign Application Priority Data

Nov. 10, 2021 (IN) .............................. 202141051406

(51) Int. Cl.
G06T 11/00 (2006.01)
G06T 7/20 (2017.01)

(52) U.S. Cl.
CPC ................ *G06T 11/00* (2013.01); *G06T 7/20* (2013.01); *G06T 2207/20081* (2013.01); *G06T 2207/30204* (2013.01)

(58) Field of Classification Search
None
See application file for complete search history.

(56) References Cited

U.S. PATENT DOCUMENTS 10,373,381 B2    8/2019   Nuernberger et al.
10,627,625 B2    4/2020   Hoover et al.
(Continued)

FOREIGN PATENT DOCUMENTS

CN    110533780 A       12/2019
KR    10-2011-0136013 A  12/2011
(Continued)

OTHER PUBLICATIONS

International Search Report and Written Opinion issued Feb. 2, 2023 by the International Searching Authority in counterpart International Patent Application No. PCT/KR2022/017480. (PCT/ISA/220, PCT/ISA/210 & PCT/ISA/237).
(Continued)

*Primary Examiner* — Nurun Flora
(74) *Attorney, Agent, or Firm* — Sughrue Mion, PLLC

(57) ABSTRACT

The present subject matter refers a virtual object positioning method in an augmented reality (AR) or virtual reality (VR) environment. The method comprises receiving a virtual object for positioning relative to one or more objects in an AR or VR scene. During the positioning, a relative position of the virtual object is detected relative to the one or more objects in the AR or VR scene and a position due to the relative movement is detected. An occurrence of change in a physical characteristic of the virtual object is predicted based on the virtual object crossing a boundary with respect (Continued)

to the one or more objects. It is determined that the virtual object is likely to cross the boundary during the positioning. Upon the determination, a prior alert is generated.

13 Claims, 18 Drawing Sheets

(56) References Cited

U.S. PATENT DOCUMENTS

| | | |
|---|---|---|
| 2011/0250962 A1 | 10/2011 | Feiner et al. |
| 2013/0286004 A1 | 10/2013 | McCulloch et al. |
| 2017/0256096 A1 | 9/2017 | Faaborg et al. |
| 2018/0120944 A1* | 5/2018 | Wang .................. G06F 1/163 |
| 2019/0102953 A1 | 4/2019 | Lindsay et al. |
| 2020/0074738 A1 | 3/2020 | Hare et al. |
| 2020/0151965 A1 | 5/2020 | Forbes et al. |
| 2020/0226823 A1 | 7/2020 | Stachniak et al. |
| 2021/0208404 A1* | 7/2021 | Hoover .................. G06F 3/013 |
| 2021/0264669 A1 | 8/2021 | Shreve |
| 2022/0058888 A1 | 2/2022 | Fu et al. |

FOREIGN PATENT DOCUMENTS

| | | |
|---|---|---|
| KR | 10-1656618 B1 | 9/2016 |
| KR | 10-2016-0149091 A | 12/2016 |
| KR | 10-1919077 B1 | 11/2018 |
| WO | 2016/051366 A2 | 4/2016 |
| WO | 2020/072591 A1 | 4/2020 |

OTHER PUBLICATIONS

Communication issued Nov. 28, 2024 by the European Patent Office in European Patent Application No. 22893159.8.

* cited by examiner

No visual indication

Visual indication appears

No visual indication

Visual indication appears

Regular movement/ No feedback

Haptic feedback

Regular movement/No Feedback

Auditory feedback

No visual indication when object is on flat surface

Gravity based visual indication on floor where
object might get dropped if moved further

METHOD AND SYSTEM FOR VIRTUAL OBJECT POSITIONING IN AN AUGMENTED REALITY OR VIRTUAL REALITY ENVIRONMENT

CROSS-REFERENCE TO RELATED APPLICATIONS

This application is a bypass continuation of International Application No. PCT/KR2022/017480, filed on Nov. 8, 2022, which claims priority from Indian Patent Application number 202141051406 filed on Nov. 10, 2021, in the Indian Patent Office, the contents of which are incorporated by reference in their entireties.

FIELD

The disclosure relates to AR/VR systems and in particular relates to improving rendering of an AR/VR scene therein.

BACKGROUND

Augmented reality (AR) or virtual reality (VR) refer to the visual indication of where an object is placed in AR space. However, such visual indication is not always useful and sometimes unnecessary. The same often adds to clutter in the scene and may decrease an application's performance. Related art technology determines where the object is suitable in AR space. However, the related art technology displays the visual indication consistently without discretion. Another related art technology determines an optimal location within the AR scene to drop an object.

However, the above-noted related art technologies do not rely on object properties and boundary definition/context mapping to show visual affordance. Moreover, the visual affordance from the related art technologies is non-intelligent and follows rigid criteria, thereby often causing visual clutter across the AR and VR scenes.

There lies at least a need to show surface/space movement related visual indicator for AR Object movement in AR Space contextually, intelligently and not continuously.

There lies a need to provide AR space information to a user selectively and declutter the view when not needed.

There lies at least a need to provide non-visual but sensible feedbacks with respect to the object movement in contextual cases.

SUMMARY

This summary is provided to introduce a selection of concepts in a simplified format that is further described in the detailed description. This summary is not intended to identify key or essential concepts of the claimed subject matter, nor is it intended for determining the scope of the claimed subject matter.

In accordance with an aspect of the disclosure, a virtual object positioning method in an augmented reality (AR) or virtual reality (VR) environment includes receiving a virtual object for positioning relative to one or more objects in an AR or VR scene; detecting, during positioning, a relative movement of the virtual object relative to the one or more objects in the AR or VR scene and a position of the virtual object due to the relative movement; predicting, during the positioning, an occurrence of a change in physical characteristic of the virtual object based on the position of the virtual object crossing a predefined boundary with respect to the one or more objects; determining that the virtual object is likely to cross the predefined boundary during the positioning; and generating a prior alert based on the determining and the predicting, the prior alert comprising a visual-effect based indicator indicating the predefined boundary upon the one or more objects in the AR or VR scene.

The generation of the prior alert may include generating a duplicate image of the virtual object having undergone the change in the physical characteristic.

The method may further include determining a selected plurality of positions adopted by the virtual object during the relative movement of the virtual object over a period of time, each of the selected plurality of positions being selected based on: a) a likelihood of the virtual object crossing the predefined boundary with respect to the one or more objects in the AR or VR scene; and b) the virtual object not crossing the boundary despite the likelihood of crossing the predefined boundary; and determining, through a machine-learning (ML) criteria, the selected plurality of positions as not eligible for triggering the generation of the prior alert.

The generating of the prior alert may include providing a supplemental feedback to the user, the supplemental feedback comprising at least one of a haptic feedback, an auditory feedback, a simulation of friction virtually, and a vibratory feedback.

The method may further include determining that the virtual object has crossed the predefined boundary during the positioning; determining that the virtual object is in a state of being held by a user by force while crossing the predefined boundary; and generating a marker for indicating a probable position of the virtual object upon the one or more objects in the AR or VR scene based on the user releasing the virtual object from the held state.

The generating of the prior alert may be based on one or more of: the physical characteristic of the virtual object; a semantic scene understanding based on the virtual object and on a real-world object in the AR or VR scene; ambient data of the AR or VR scene collected from at least one of sensors and a remote device; a usage pattern of a user of the AR or VR scene; a user profile of the user of the AR or VR scene; and realistic physics of the AR or VR scene.

The physical characteristic of the virtual object may include one or more of position, orientation, ambience, state, shape, color, and texture.

In accordance with an aspect of the disclosure, a virtual object positioning system in an augmented reality (AR) or virtual reality (VR) environment includes a memory and a processor configured to receive a virtual object for positioning relative to one or more objects in an AR or VR scene; detect, during positioning, a relative movement of the virtual object relative to the one or more objects in the AR or VR scene and a position of the virtual object due to the relative movement; predict, during the positioning, an occurrence of a change in physical characteristic of the virtual object based on the position of the virtual object crossing a predefined boundary with respect to the one or more objects; determine that the virtual object is likely to cross the predefined boundary during the positioning; and generate a prior alert based on the determining and the predicting, the prior alert comprising a visual-effect based indicator indicating the predefined boundary upon the one or more objects in the AR or VR scene.

The generation of the prior alert may further include generating a duplicate image of the virtual object having undergone the change in the physical characteristic.

The processor may be further configured to determine a selected plurality of positions adopted by the virtual object during the relative movement of the virtual object over a period of time, each of the selected plurality of positions being selected based on: a) a likelihood of the virtual object crossing the predefined boundary with respect to the one or more objects in the AR or VR scene; and b) the virtual object not crossing the boundary despite the likelihood of crossing the predefined boundary; and determine, through a machine-learning (ML) criteria, the selected plurality of positions as not eligible for triggering the generation of the prior alert.

The generating of the prior alert may include providing a supplemental feedback to the user, the supplemental feedback including at least one of a haptic feedback, an auditory feedback, a simulation of friction virtually, and a vibratory feedback.

The processor may be further configured to determine that the virtual object has crossed the predefined boundary during the positioning; determine that the virtual object is in a state of being held by a user by force while crossing the predefined boundary; and generate a marker for indicating a probable position of the virtual object upon the one or more objects in the AR or VR scene based on the user releasing the virtual object from the held state.

The generating of the prior alert may be based on one or more of the physical characteristic of the virtual object; a semantic scene understanding based on the virtual object and on a real-world object in the AR or VR scene; ambient data of the AR or VR scene collected from at least one of sensors and a remote device; a usage pattern of a user of the AR or VR scene; a user profile of the user of the AR or VR scene; and realistic physics of the AR or VR scene.

The physical characteristic of the virtual object may include one or more of position, orientation, ambience, state, shape, color, and texture.

The disclosure refers a surface/space movement related visual indicator for AR object movement in AR space contextually. The visual indicator is shown based on boundary detection and intent. This aids in providing AR space information to a user when required and declutters the view when not needed. Along with visual indication, virtual friction is also rendered. The virtual friction is rendered by means of slowing the movement of object or by haptic feedback.

In an example, the visual feedback is provided based on intelligence/usage data. This is mainly for decluttering as visual feedback often causes clutter to a user. In an example, if a user keeps moving an object from table to floor multiple times, the visual feedback for table boundary may not important for the user and may not be shown. Instead, a gravity related visual feedback may be shown or no feedback may be shown for the object in the future.

In an example, when the object approaches an edge of the surface, a virtual friction is applied to the object. For example, the movement of the object becomes slower or haptic feedback is given to user. This helps inform the user about a state change to be applied upon the object in contextual cases.

To further clarify the advantages and features of the disclosure, a more particular description of the invention will be rendered by reference to specific embodiments thereof, which are illustrated in the appended drawings. The accompanying drawings depict typical embodiments of the disclosure and are therefore not to be considered limiting of its scope. Aspects of the disclosure will be described and explained with additional specificity and detail with the accompanying drawings.

BRIEF DESCRIPTION OF THE DRAWINGS

The above and other features, aspects, and advantages of certain embodiments of the invention will be more apparent from the following detailed description taken in conjunction with the accompanying drawings in which.

Figure 1:
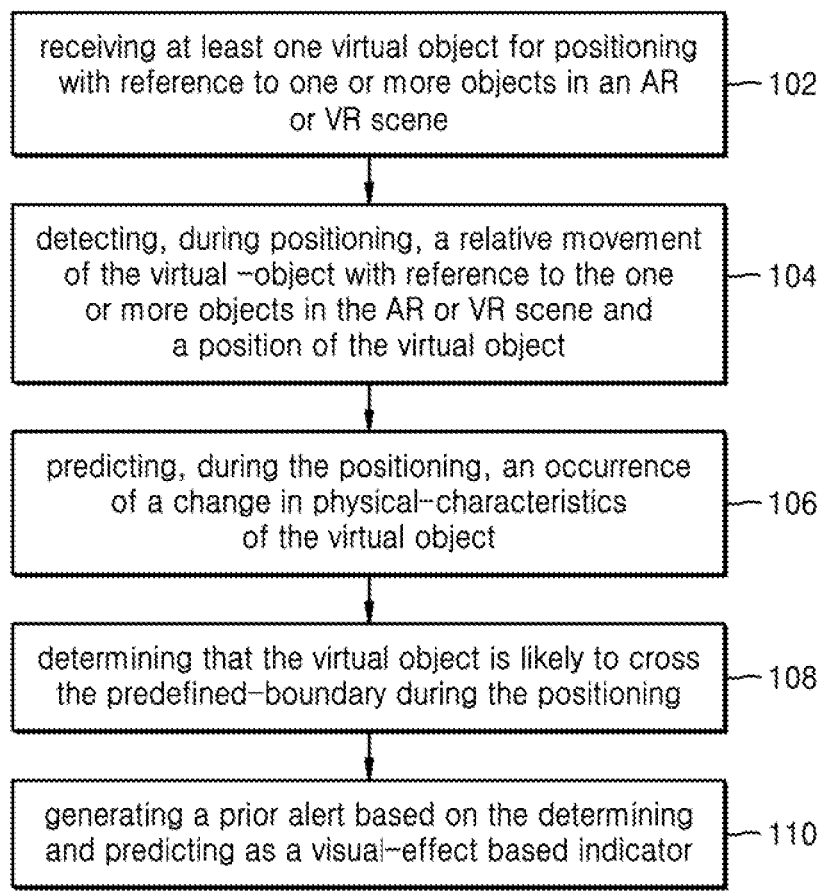
FIG. 1 illustrates a virtual object positioning method in an augmented reality (AR) or virtual reality (VR) environment.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1 illustrates a virtual object positioning method in an augmented reality (AR) or virtual reality (VR) environment.

The method comprises receiving (102) at least one virtual object for positioning with reference to (e.g., relative to) one or more objects in an AR or VR scene. During positioning, a relative movement of the virtual object is detected (104) relative to the one or more objects in the AR or VR scene and also a position of the virtual object due to said movement. An occurrence of a change is predicted (106) in a physical characteristic of the virtual object if the virtual object crosses a boundary with respect to the one or more objects. The physical characteristic of the virtual object is defined by (e.g., includes) one or more of position, orientation, ambience, state, shape, color, and texture.

Further, it is determined (108) if the virtual object is likely to cross the boundary during the positioning. In such a scenario, a prior alert is generated. Such prior alert is subject to one or more conditions as one or more of: a semantic scene understanding underlying the virtual object in the AR or VR scene; ambient data collected from sensors and remote device; a usage pattern; a user profile; and realistic physics of the AR or VR scene.

The prior alert may be generated (110) as a visual-effect based indicator indicating said boundary upon the one or more objects in the AR or VR scene. Such prior alert may also be generated as a duplicate image of the virtual object having undergone the change in the physical state.

The generating of the prior alert may be further accompanied by providing a supplemental feedback to the user including at least one of a haptic-feedback, an auditory feedback, a simulation of friction virtually, and a vibratory feedback. In an example, the supplemental feedback may be provided instead of the visual-effect based indicator.

Figure 2A:
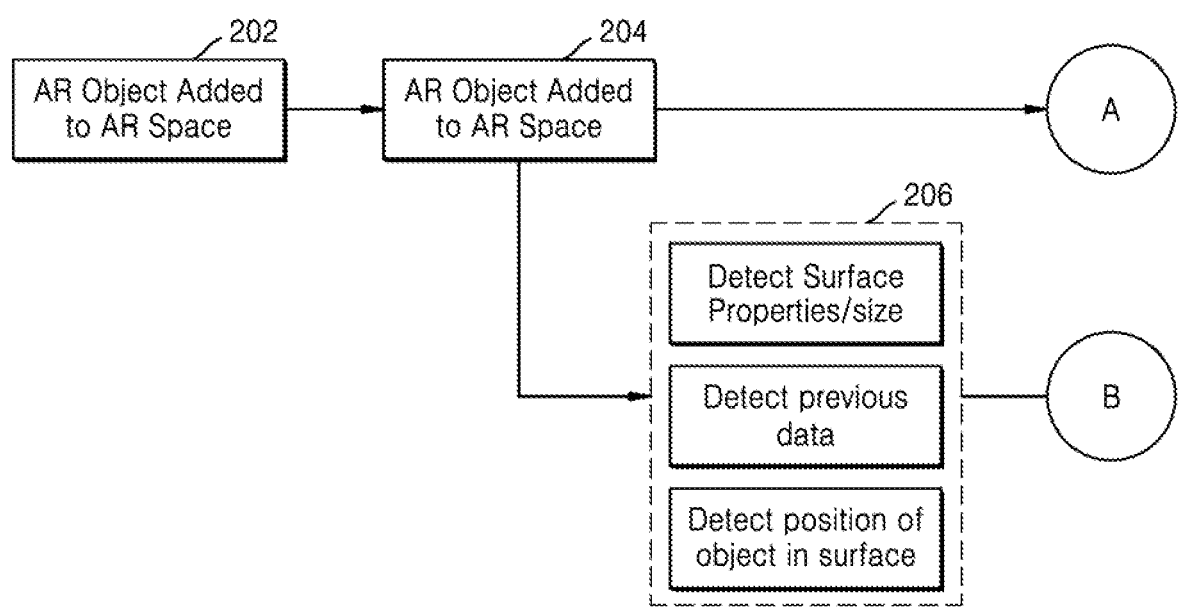
FIGS. 2A and 2B illustrate a proposed control flow in accordance with an embodiment.
Figure 2B:
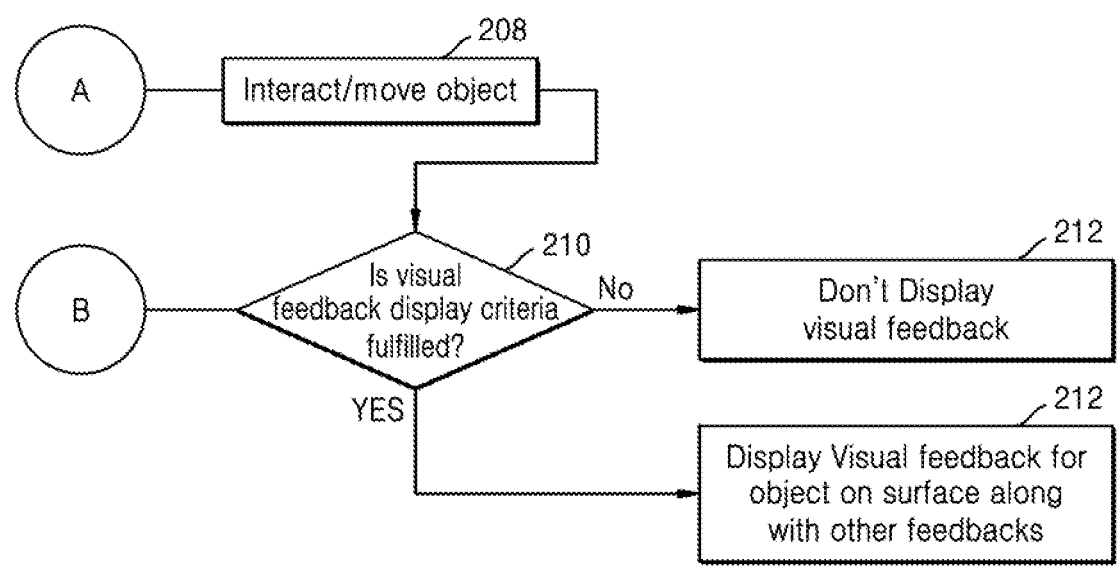

FIGS. 2A and 2B illustrate a proposed control flow in accordance with an embodiment of the disclosure.

At step 202, an AR object or a complete virtual object (i.e. VR object), hereinafter referred to as object, is added to an AR or VR environment.

At step 204, the added AR/VR object is attached to or linked with a surface within the AR or VR environment. The surface may be a virtual surface or a real-world surface.

At step 206, object location and properties are identified. In addition, properties of the surface upon which the AR/VR object resides are also identified. The properties are identified or detected such as surface properties, surface size, position of object within the surface, etc.

At step 208, a movement of the object occurs in space.

The steps 202 to 208 correspond to steps 102 to 104 of FIG. 1

At step 210, the device analyzes a visual-feedback display criteria defined by properties, usage data, ambient information and others to recognize whether visual feedback and/or additional feedbacks are needed. Examples of possible visual feedback display criteria include: object characteristics; semantic scene understanding; ambient data of the AR or VR scene collected from sensors and/or a cloud (e.g., a remote device); a usage pattern of a user; a user profile; and Realistic physics of the scene.

The step 210 corresponds to steps 106 and 108 of FIG. 1.

At step 212, the visual feedback for the object is displayed on the surface if the visual feedback display criteria is fulfilled.

At step 212, if additional feedback (e.g., haptic feedback/virtual friction) criteria is fulfilled at step 210, then the visual feedback for the object on the surface is displayed along with other feedbacks. In an example, the additional feedback may be exhibited solely without the visual feedback.

Figure 3A:
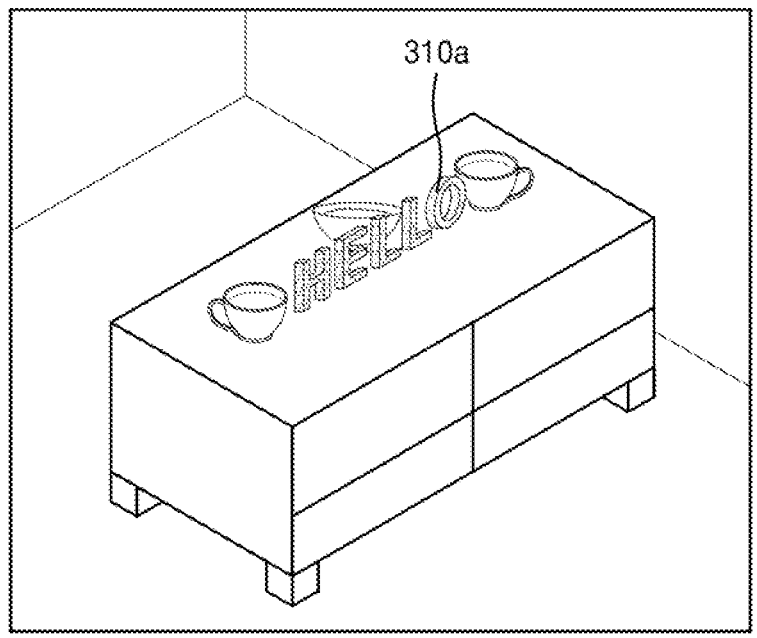
FIGS. 3A and 3B illustrate a state change visual-feedback mechanism in accordance with an embodiment.
Figure 3A:
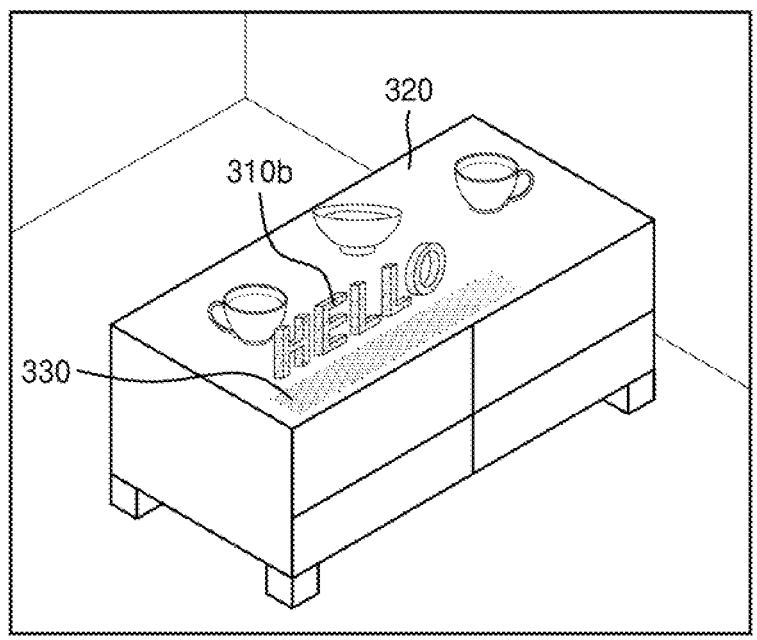
Figure 3B:
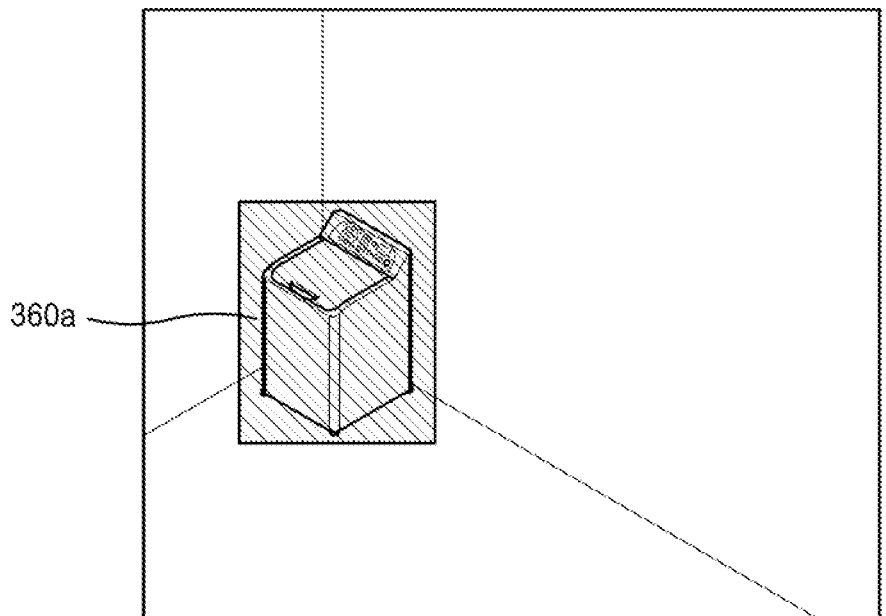
Figure 3B:
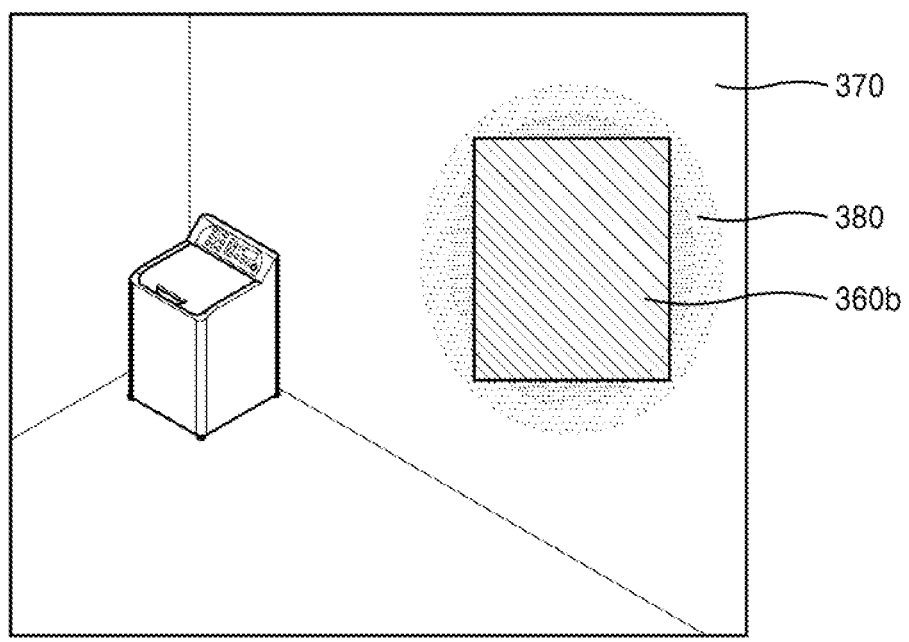

FIGS. 3A and 3B illustrate an example of a state change visual-feedback mechanism corresponding to step 212. As visual indicators are not required at all times when the object (310a) is in surface or space, the object status is going to be unchanged. Accordingly, clutter may be reduced for visual-indicators. In an example, when the object (310b) is near a state change (e.g., when the object is at the edge of table (320) or wall), the indication (330) may appears to inform a user about state change possibilities.

As indicated in FIG. 3A, no visual-indication is rendered when the object (310a) is at the center of a surface (e.g., a table (320)). However, the visual indication (330) appears when the object (310b) is close to state change, for example, when the object (310b) is approaching an edge of the table (320).

As indicated in FIG. 3B, no visual indication is rendered when the object (360a) is dragged in air. However, visual indication (380) appears when object (360b) is close to a surface (370) where it could have state change. For example, the visual indication (380) may be an AR object that appears to be on the surface (370).

Example of the visual indication based feedback and other types of feedback include: i) an indication of the edge of a table for an object on the table; ii) an indication of a position close to a wall when the object is in air; and iii) an indication near a physical object placed on a surface when the physical object is obstructing the movement of the AR object on surface.

FIGS. 4A to 4D illustrate additional contextual feedbacks to be offered alongside the visual feedback or solely and corresponds to steps 210 and 212 of FIG. 2B. In an embodiment, the generating of the prior alert further comprises providing a supplemental feedback to the user including at least one of a haptic feedback, an auditory feedback, a simulation of friction virtually, and a vibratory feedback.

In an embodiment, when an additional feedback (e.g., haptic feedback/virtual friction) criteria is fulfilled, visual feedback is offered for the object on a surface along with other non-visual feedbacks. However, the disclosure is not limited thereto, and only the non-visual feedback may be rendered.

Figure 4A:
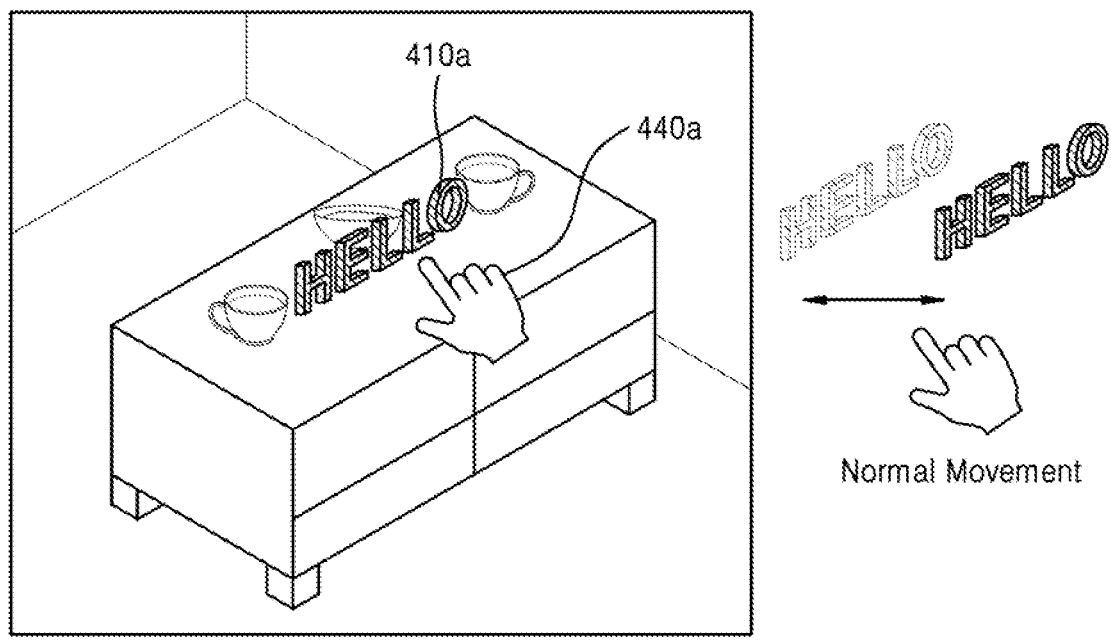
FIGS. 4A-4D illustrate additional contextual feedbacks to be offered alongside the visual feedback in accordance with an embodiment.

In an example, varying movement speed of the object may be provided as a feedback. FIG. 4A shows an idle state wherein the rate of movement of the object (410a) is based on a finger touch point (440a), such that the position of the object (410a) is constant relative to the position of the touch point of the finger (440a). Accordingly, FIG. 4A corresponds to a normal movement of the object (410a) with respect to the movement of the touch point of the finger (440a).

Figure 4B:
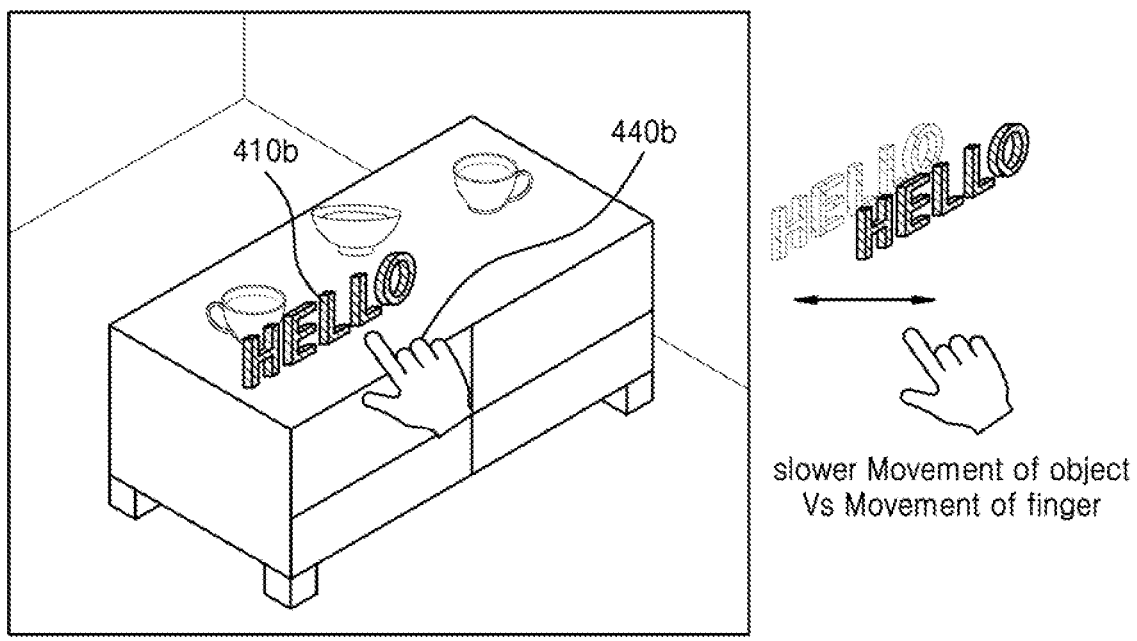

As shown in FIG. 4B, non-visual feedback may be rendered such as slowing down the movement of the object (410b) to simulate friction virtually. The rate of movement of the object (410b) is based on the position of the touch point of the finger (440b), such that the rate slows down as the object (410b) nears the edge of table (420b). The same results in slower movement of the object (410b) relative to the movement of the touch point of the finger (440b).

Figure 4C:
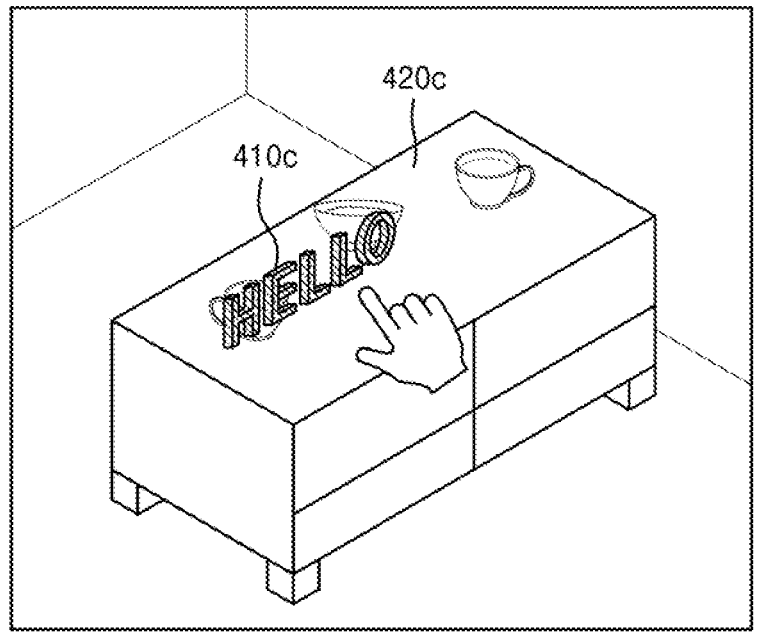
Figure 4C:
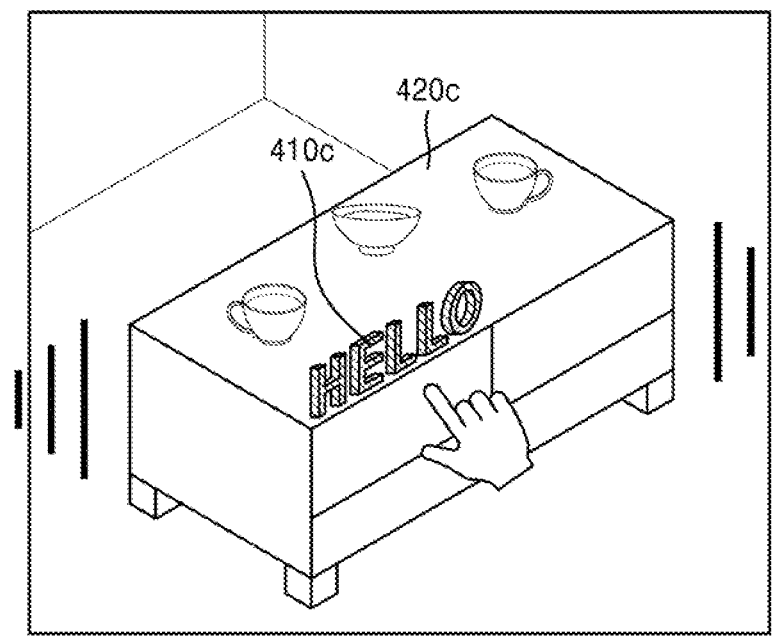

FIG. 4C shows haptic feedback that may occur as the object (410c) nears the edge of the table (420c). For example, the screen displaying the object (410c) may vibrate when the object (410c) nears the edge of the table (420c).

Figure 4D:
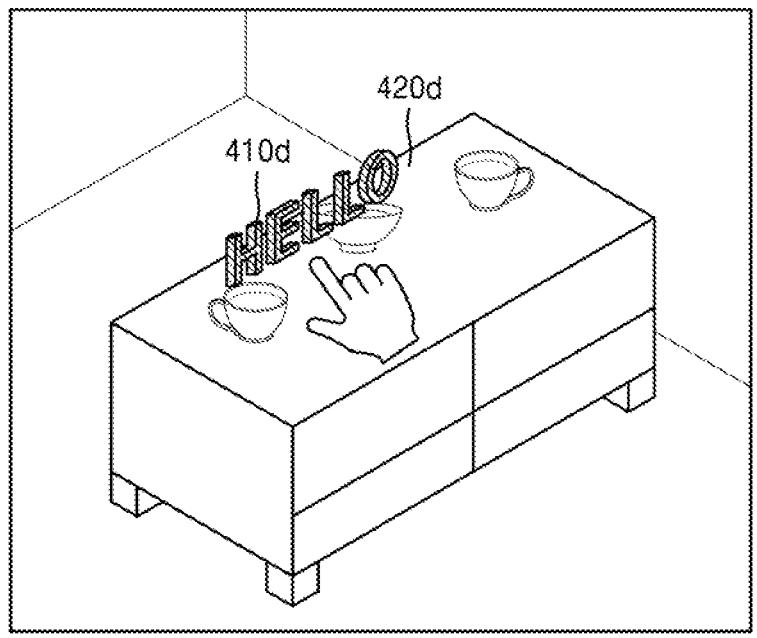
Figure 4D:
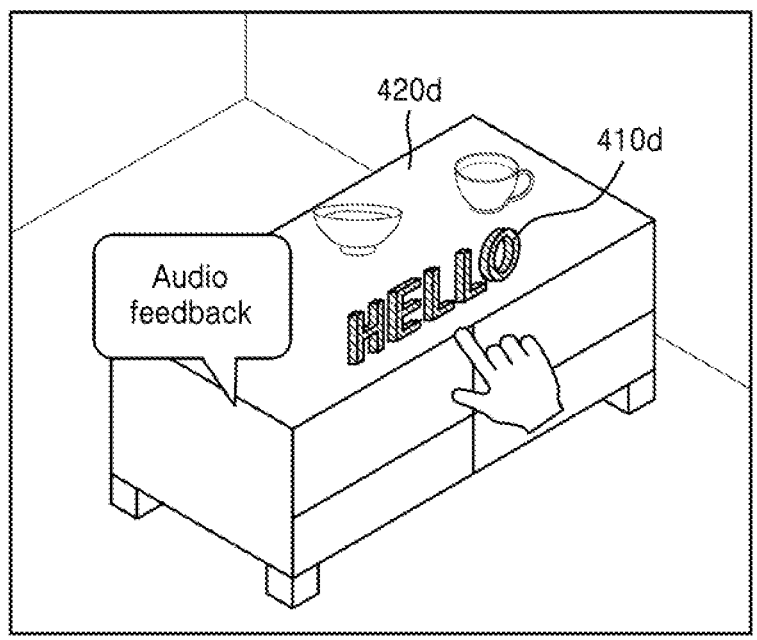

FIG. 4D shows an example of providing audio feedback (450d). For example, the audio phrase "Object is very close to the edge. Be careful while moving forward" may be rendered when the object (410d) nears the edge of the table (420d) indicating edge detection, stopping object movement and seeking additional confirmation to move further.

FIGS. 5A to 5D illustrate an example of applying underlying physics such as gravity and force to the object while moving from one position another in the AR/VR environment.

Figure 5A:
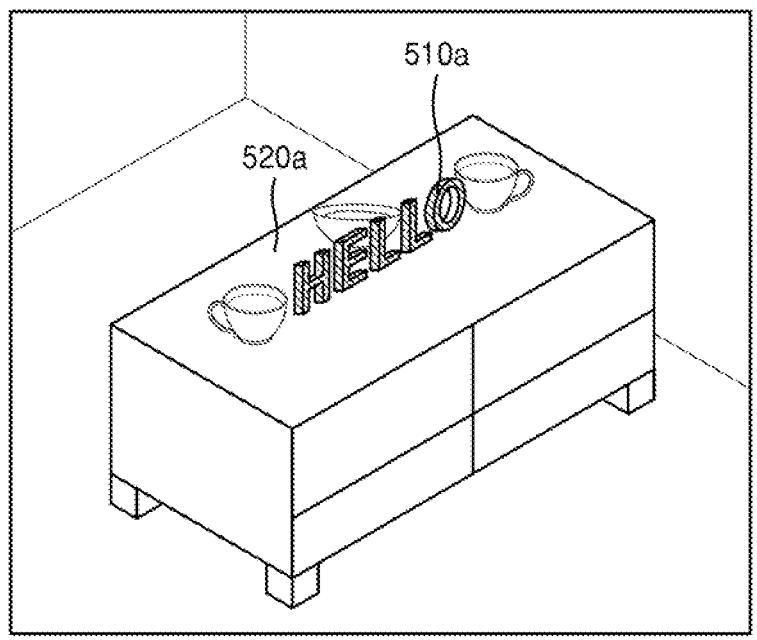
FIGS. 5A-5D illustrate effect of underlying physics such as gravity and force upon the object while moving from one position another in the AR/VR environment in accordance with an embodiment.

As far as gravity is concerned, when the user is dragging a virtual object on a table surface, the user may intuitively understand that the object should remain on the table surface when being dragged. Accordingly, no visual feedback is shown in FIG. 5A when the object (510a) is not near an edge of the table (520a). Accordingly, no visual indication is rendered when object (510a) is on a flat surface. The above-described embodiment resembles the real world when an object (510a) is pushed on a flat surface because it will always stay on the plane due to gravity (e.g., does not float away) and does not penetrate the table (520a) surface.

Figure 5B:
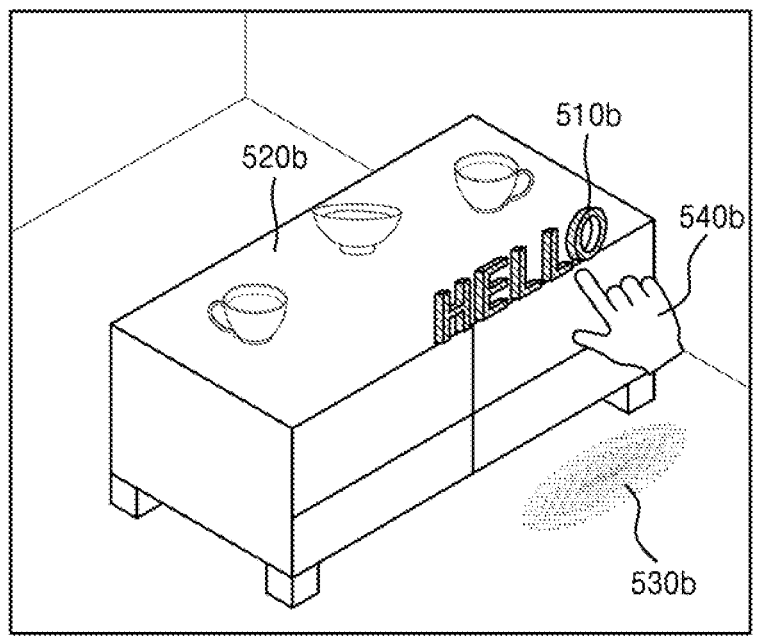

As an example, if an object (510b) is on the edge of the table (520b), then visual feedback may appear on the ground near the edge of the table (520b) as shown in FIG. 5B. Upon release of the finger (540b), the user may intuitively understand that the object (510b) would drop down because a majority of its volume is hanging in the air and therefore it is not in a position to stay on the table (520b) upon release of the finger (540b).

As a second possibility, visual feedback (530b) may begin appearing on the table edge and subsequently on the ground when the system anticipates that due to velocity and/or acceleration the object (510b) may go over the edge.

As another example of a realistic physics "force", when a user is dragging an object on a vertical plane, the objects may move along the vertical plane only as long as fingers keep touching the object such that the object may appear to stick to the vertical plane.

In an embodiment, it is determined that the virtual object has crossed a predefined boundary during the positioning. It is further determined that that the virtual object is held by a user by force while crossing the predefined boundary. Accordingly, a marker is generated for indicating a probable position of the virtual object in case the user releases the virtual object from the held state.

Figure 5C:
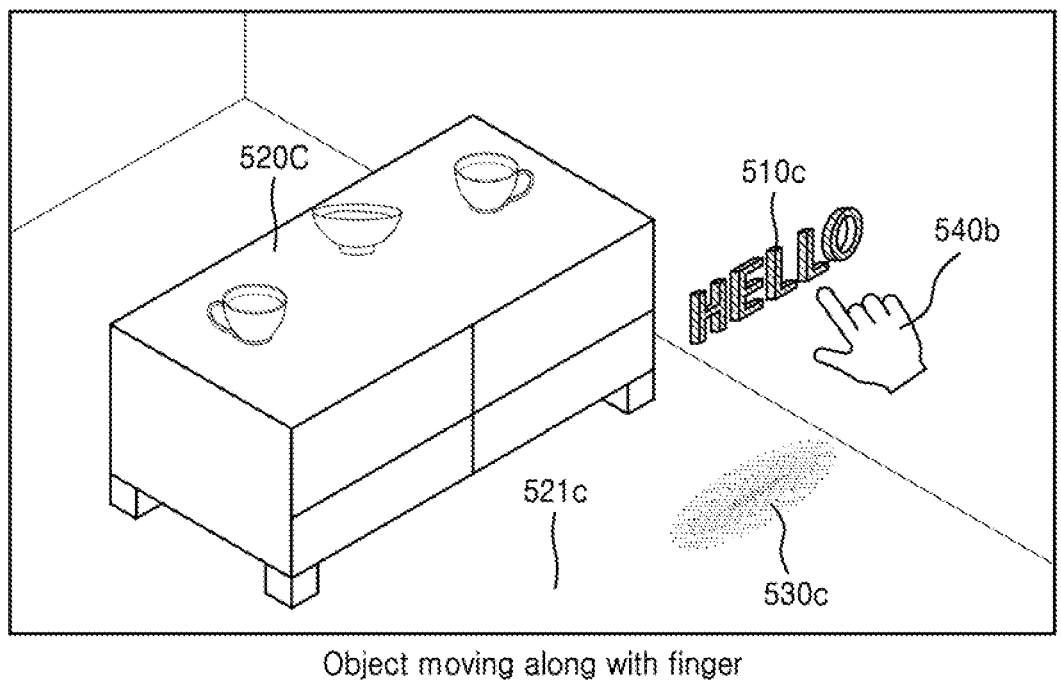
Figure 5D:
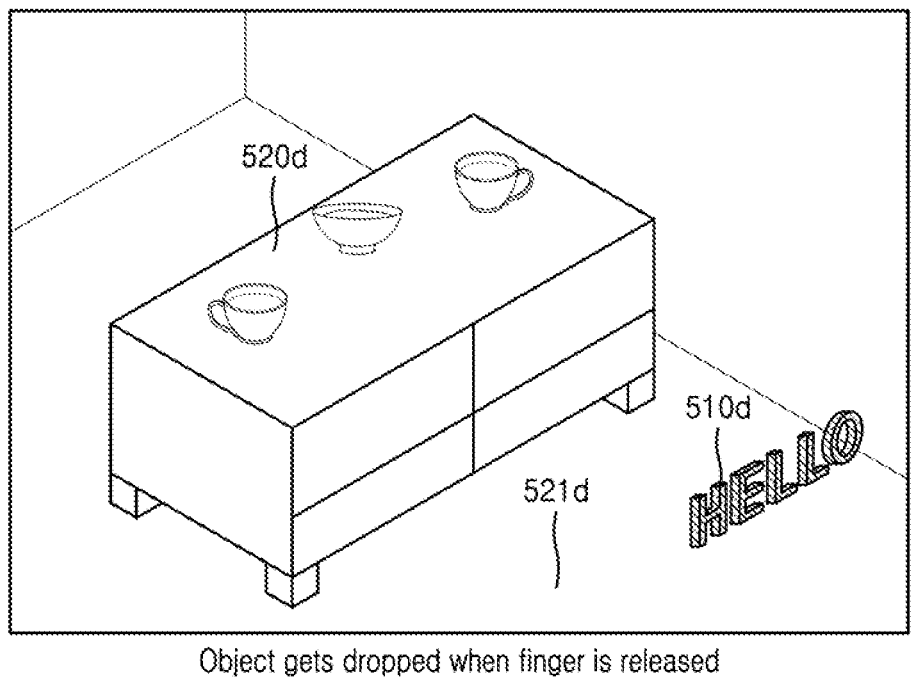

As shown in FIG. 5C, the visual feedback (530c) maybe shown as a marker on the ground/horizontal plane where the virtual object (510c) would drop if the finger (540c) is released. In this case, gravity appears to take over and cause the object (510c) to drop down to the floor (521c) from the edge of the table (520c). Accordingly, as shown in FIG. 5O, a gravity based visual indication (530c) is shown on the floor (521c) where the object (510c) may be dropped if moved farther off the edge of the table (520c). And, as shown in FIG. 5D, the object (510d) may get dropped when the finger (530c in FIG. 5) is released.

Figure 6A:
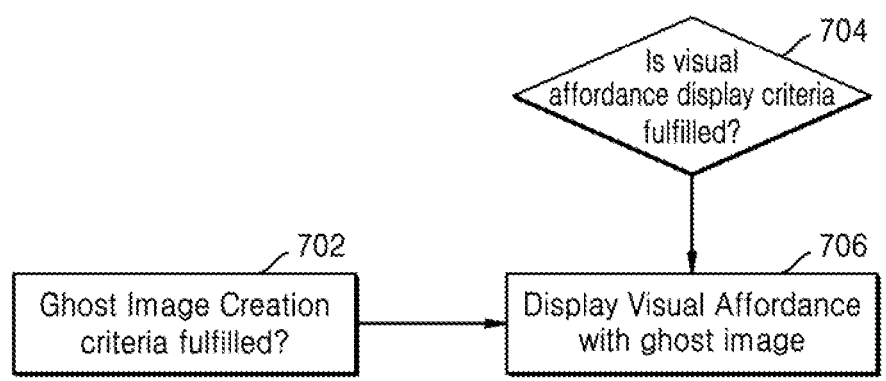
FIGS. 6A and 6B illustrate a ghost image creation as part of visual affordance in accordance with an embodiment.
Figure 6B:
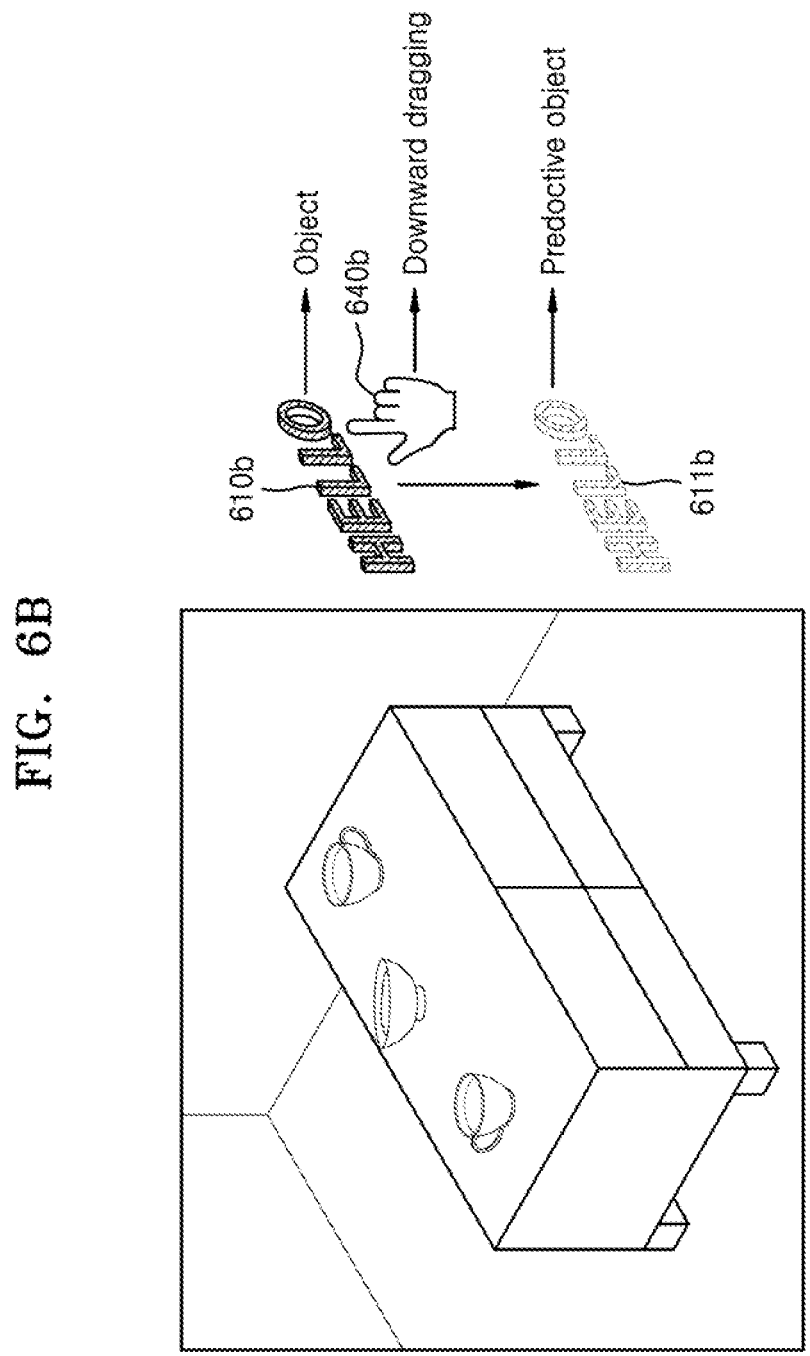

FIGS. 6A and 6B illustrate a ghost image creation as part of visual feedback. Possible ghost image display criteria are denoted by various positions of the object. For example, the visual feedback may indicate that the object is going to be rotated when moved further, the object will considerably scale when moved further, the object properties may change after the movement, etc.

A ghost image is created while dragging/moving an object. A computing engine detects the future-location of the object based on ongoing interaction and visually shows the user where and how the object is going to be placed. This will benefit the user in predicting how the object will appear after moving and the user may therefore make an informed decision about the movement.

FIG. 6A shows a process for displaying a ghost image. It is determined (702) whether ghost image creation criteria are fulfilled and (704) whether visual feedback display criteria are fulfilled. When both criteria are fulfilled at (702) and (704), visual feedback in the form of a ghost image is displayed at (706).

FIG. 6B illustrates an object (610b) being moved by a finger (640b) as long as the finger (640b) is touching it. As shown, the object (610b) may be dropped when the finger (640b) is released to a position corresponding to a position of a ghost image. In other words, the dropped object (611b) may be located on the floor when the finger (640b) is released.

Figure 7:
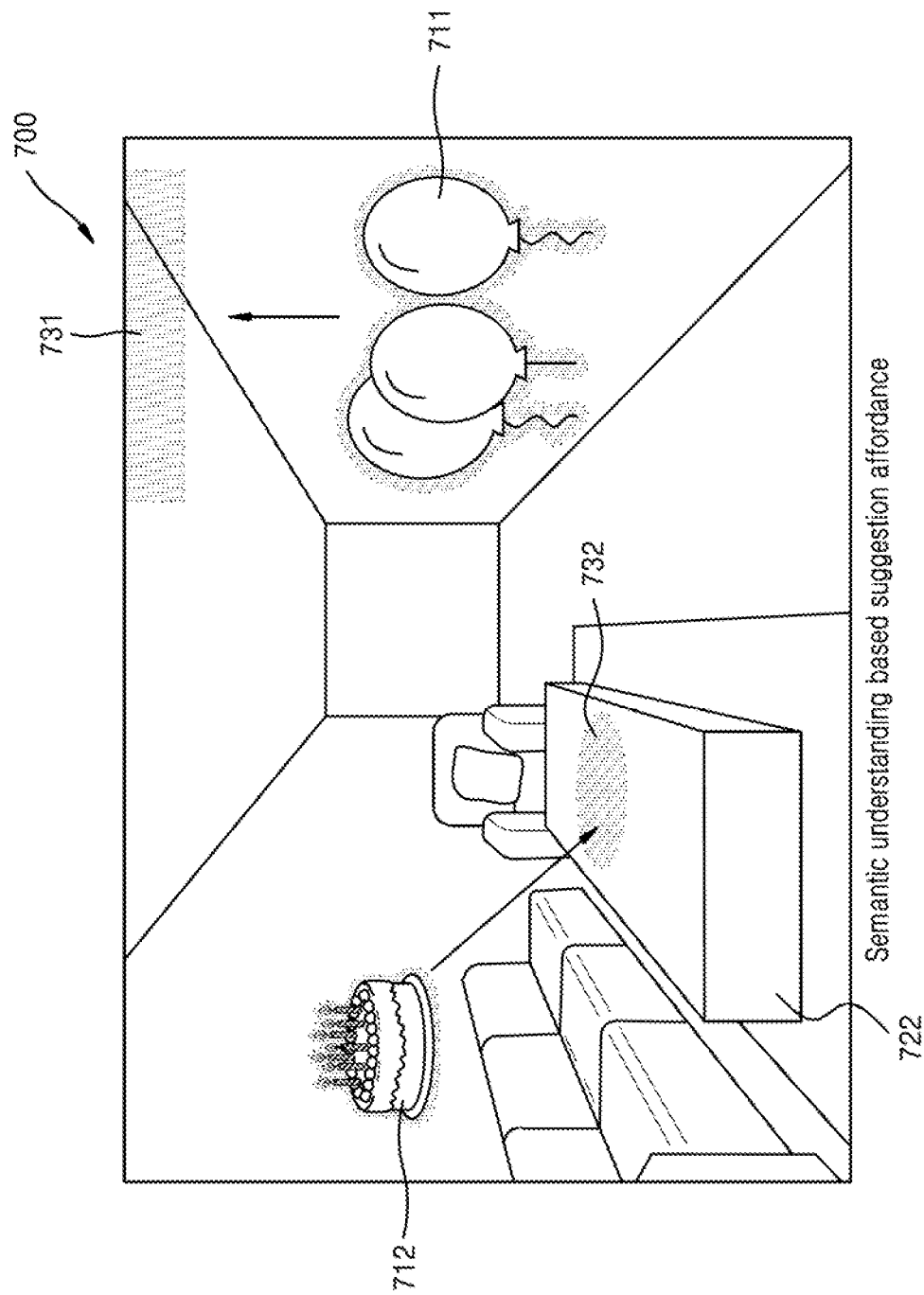
FIG. 7 illustrates predictive positioning and relevance based affordance in accordance with an embodiment.

FIG. 7 illustrates predictive positioning and relevance based visual feedback (731, 732). The relevance based visual feedback (731, 732) is exhibited when a user brings the object (711, 712) into AR space (700). For example, the user may brings the object (711, 712) into AR space (700) by dragging the object (711, 712) into the AR space (700) and then visual feedback (731, 732) may be exhibited. A visual feedback (711, 712) appears on a most relevant surface nearby only when the device determines the feedback to be relevant. For example, a visual feedback (732) may appear on a table (722) showing that a cake AR object (712) is suitable for placement on the table (722). For example, a visual feedback (731) may appear on the ceiling showing that a balloons AR object (711) is suitable for placement on the ceiling. For example, a visual feedback may appear on an empty wall showing that a picture AR object is suitable for placement on the empty wall. Upon leaving the object, the object may become attached to the relevant surface.

Figure 8:
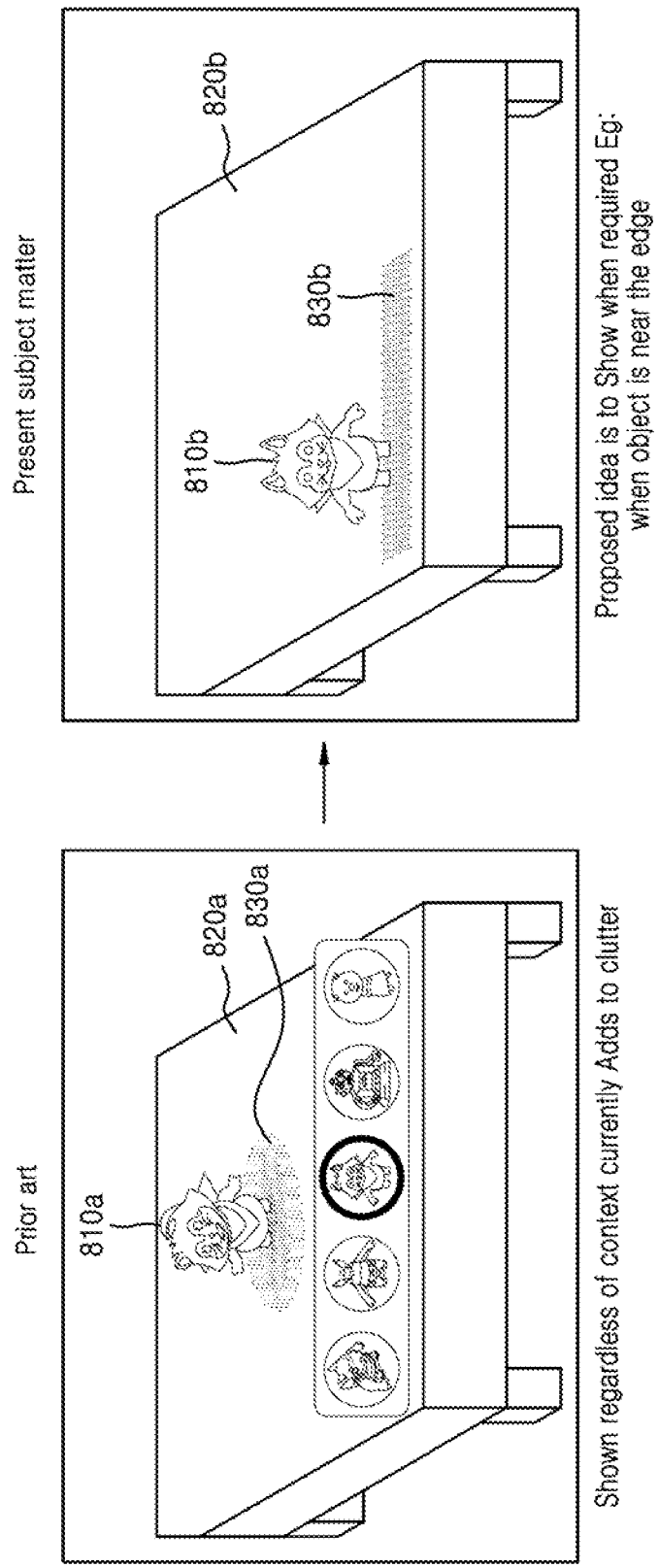
FIG. 8 illustrates comparison between prior art and the present subject matter in accordance with an embodiment.

FIG. 8 illustrates a comparison between the disclosure and a prior art device. As shown, the prior art device renders a visual indication (830a) in an AR/VR environment regardless of context and adds to clutter. As shown, a grid of white circles are shown as visual feedback regardless of the position of the AR object (810a) on the table (820a).

However, according to an embodiment, the visual indication (830b) is rendered only when required, e.g., when the AR object (810b) is near the edge of the table (820b). The AR space may be decluttered thereby during the user interaction, which in turn leads to accuracy of object movement/placement and improved performance such as reduction on visual processing.

Intelligently placed visual feedback may aid a user in guiding physics based object placement. Predictions according to embodiments may evolve based on a user's behavior and preference.

In an embodiment, a selected plurality of positions adopted by the virtual object during the relative movement of the virtual object over a period of time are determined. Such selected plurality of positions may be selected based on:
  a) a likelihood of the virtual object crossing the predefined boundary with respect to the one or more objects in the AR or VR scene;
  b) the virtual object not crossing the predefined boundary despite said likelihood of crossing the predefined boundary.

Based on such determination, it is further determined through a machine-learning (ML) criteria that the selected plurality of positions are not eligible for triggering the generation of the prior alerts. For example, if it is determined that a user often prefers not to place objects on ground, the auto gravity effect may be disabled after the machine-learning.

Further, intelligent visual feedback may help in decluttering preview space for occasions when visual feedback is unnecessary. The user may be provided with haptic/sensory feedback along with virtual friction while at the edge of a surface which may help improve placement and informed decision making.

Figure 9:
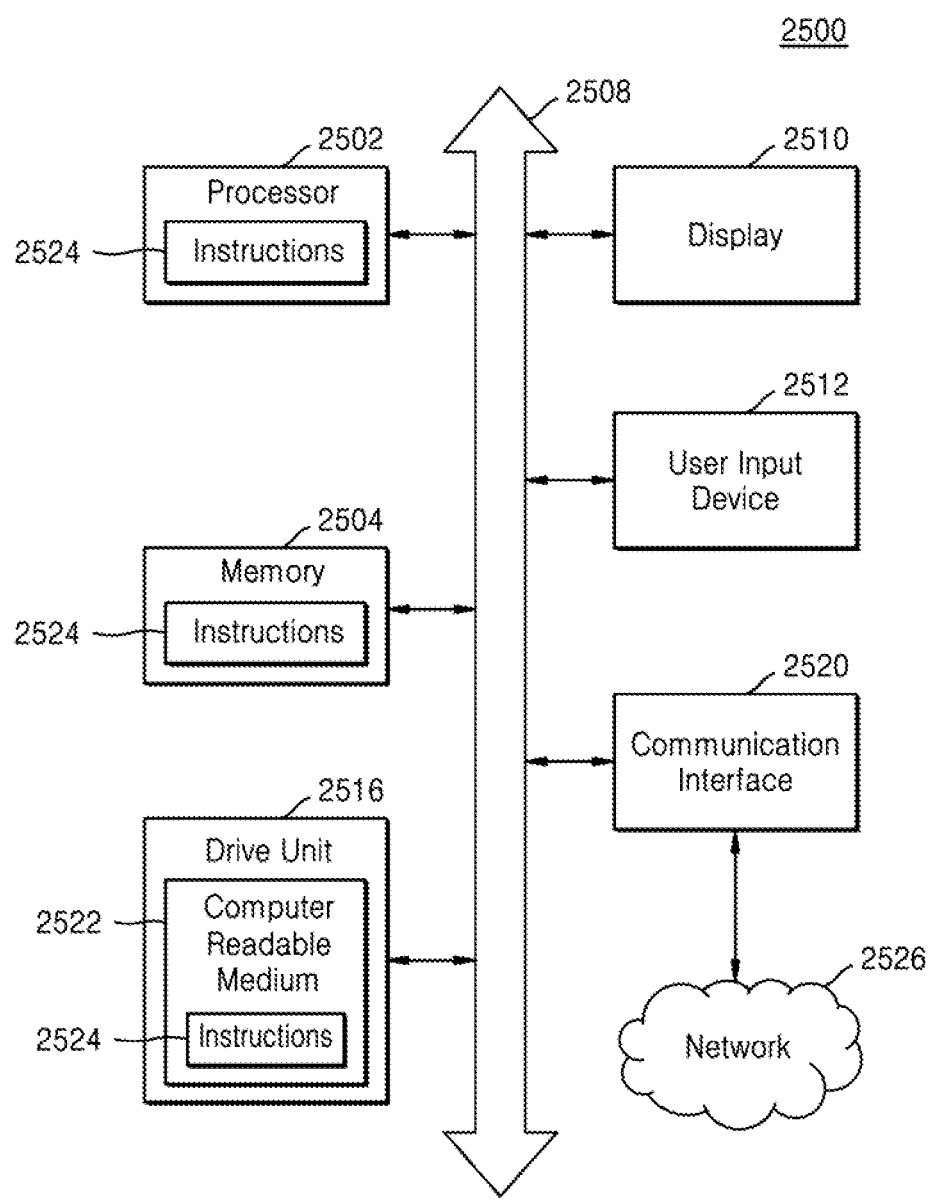
FIG. 9 illustrates an example implementation in accordance with the embodiment.

FIG. 9 illustrates an example implementation in accordance with an embodiment, and a typical hardware configuration of a device in the preceding figures through a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

In addition, the memory 2504 may, in some examples, be considered a non-transitory storage medium. The term "non-transitory" may indicate that the storage medium is not embodied in a carrier wave or a propagated signal. However, the term "non-transitory" should not be interpreted that the memory 2504 is non-movable. In some examples, the memory 2504 can be configured to store larger amounts of information than the memory. In certain examples, a non-transitory storage medium may store data that can, over time, change (e.g., in Random Access Memory (RAM) or cache). The memory 2504 can be an internal storage or it can be an external storage unit of the computer system 2500, a cloud storage, or any other type of external storage.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include a user input device 2512 configured to allow a user to interact with any of the components of system 2500. The computer system 2500 may also include a disk or optical drive unit 2516. The drive unit 2516 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

The disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication interface 2520 may be created in software or maybe a physical connection in hardware. The communication interface 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 2526 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

While specific language has been used to describe the disclosure, any limitations arising on account of the same are not intended. As would be apparent to a person in the art, various working modifications may be made to the method in order to implement the disclosure as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A virtual object positioning method in an augmented reality (AR) or virtual reality (VR) environment, the method comprising:
    receiving a virtual object for positioning relative to one or more objects in an AR or VR scene;
    detecting, during positioning, a relative movement of the virtual object relative to the one or more objects in the AR or VR scene and a position of the virtual object due to the relative movement;
    predicting, during the positioning, an occurrence of a change in physical characteristic of the virtual object based on the position of the virtual object crossing a predefined boundary with respect to the one or more objects;
    determining that the virtual object is likely to cross the predefined boundary during the positioning; and
    generating a prior alert based on the determining and the predicting, the prior alert comprising a visual-effect based indicator indicating the predefined boundary upon the one or more objects in the AR or VR scene, wherein the generation of the prior alert comprises generating a duplicate image of the virtual object which undergoes the change in the physical characteristic.

2. The method of claim 1, further comprising:
    determining a selected plurality of positions adopted by the virtual object during the relative movement of the virtual object over a period of time, each of the selected plurality of positions being selected based on:
    a) a likelihood of the virtual object crossing the predefined boundary with respect to the one or more objects in the AR or VR scene; and
    b) the virtual object not crossing the predefined boundary despite the likelihood of crossing the predefined boundary; and
    determining, through a machine-learning (ML) criteria, the selected plurality of positions as not eligible for triggering the generation of the prior alert.

3. The method of claim 1, wherein the generating of the prior alert comprises providing a supplemental feedback to a user, the supplemental feedback comprising at least one of a haptic feedback, an auditory feedback, a simulation of friction virtually, and a vibratory feedback.

4. The method of claim 1, further comprising:
    determining that the virtual object has crossed the predefined boundary during the positioning;
    determining that the virtual object is in a state of being held by a user by force while crossing the predefined boundary; and
    generating a marker for indicating a probable position of the virtual object upon the one or more objects in the AR or VR scene based on the user releasing the virtual object from the held state.

5. The method of claim 1, wherein the generating of the prior alert is based on one or more of:
    the physical characteristic of the virtual object;
    a semantic scene understanding based on the virtual object and on a real-world object in the AR or VR scene;
    ambient data of the AR or VR scene collected from at least one of sensors and a remote device;
    a usage pattern of a user of the AR or VR scene;
    a user profile of the user of the AR or VR scene; and
    realistic physics of the AR or VR scene.

6. The method of claim 1, wherein the physical characteristic of the virtual object comprises one or more of position, orientation, ambience, state, shape, color, and texture.

7. A virtual object positioning system in an augmented reality (AR) or virtual reality (VR) environment, the system comprising a memory and a processor configured to:
    receive a virtual object for positioning relative to one or more objects in an AR or VR scene;
    detect, during positioning, a relative movement of the virtual object relative to the one or more objects in the AR or VR scene and a position of the virtual object due to the relative movement;
    predict, during the positioning, an occurrence of a change in physical characteristic of the virtual object based on the position of the virtual object crossing a predefined boundary with respect to the one or more objects;

determine that the virtual object is likely to cross the predefined boundary during the positioning; and generate a prior alert based on the determining and the predicting, the prior alert comprising a visual-effect based indicator indicating the predefined boundary upon the one or more objects in the AR or VR scene, wherein the generation of the prior alert further comprises generating a duplicate image of the virtual object which undergoes the change in the physical characteristic.

8. The system of claim 7, wherein the processor is further configured to:

determine a selected plurality of positions adopted by the virtual object during the relative movement of the virtual object over a period of time, each of the selected plurality of positions being selected based on:
  a) a likelihood of the virtual object crossing the predefined boundary with respect to the one or more objects in the AR or VR scene; and
  b) the virtual object not crossing the predefined boundary despite the likelihood of crossing the predefined boundary; and determine, through a machine-learning (ML) criteria, the selected plurality of positions as not eligible for triggering the generation of the prior alert.

9. The system of claim 7, wherein the generating of the prior alert comprises providing a supplemental feedback to a user, the supplemental feedback comprising at least one of a haptic feedback, an auditory feedback, a simulation of friction virtually, and a vibratory feedback.

10. The system of claim 7, wherein the processor is further configured to:

determine that the virtual object has crossed the predefined boundary during the positioning;

determine that the virtual object is in a state of being held by a user by force while crossing the predefined boundary; and generate a marker for indicating a probable position of the virtual object upon the one or more objects in the AR or VR scene based on the user releasing the virtual object from the held state.

11. The system of claim 7, wherein the generating of the prior alert is based on one or more of:

the physical characteristic of the virtual object;

a semantic scene understanding based on the virtual object and on a real-world object in the AR or VR scene;

ambient data of the AR or VR scene collected from at least one of sensors and a remote device;

a usage pattern of a user of the AR or VR scene;

a user profile of the user of the AR or VR scene; and realistic physics of the AR or VR scene.

12. The system of claim 7, wherein the physical characteristic of the virtual object comprises one or more of position, orientation, ambience, state, shape, color, and texture.

13. A non-transitory computer-readable storage medium, having a computer program stored thereon that performs, when executed by a processor, the method according to claim 1.

* * * * *